United States Patent
Endo et al.

(10) Patent No.: US 9,863,496 B2
(45) Date of Patent: Jan. 9, 2018

(54) DAMPING COMPONENT AND STRUCTURE INCLUDING THE SAME

(71) Applicant: CANON KABUSHIKI KAISHA, Tokyo (JP)

(72) Inventors: Rie Endo, Yokohama (JP); Katsunori Yokoyama, Suntou-gun (JP); Shinji Yamamoto, Kawasaki (JP); Kazuaki Takahata, Kawasaki (JP); Kazumasa Shibata, Kawasaki (JP); Hiroki Kasama, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/073,887

(22) Filed: Mar. 18, 2016

(65) Prior Publication Data

US 2016/0273612 A1   Sep. 22, 2016

(30) Foreign Application Priority Data

Mar. 20, 2015   (JP) ................. 2015-057877

(51) Int. Cl.
   *F16F 7/00*   (2006.01)
   *F16F 15/08*   (2006.01)
   *F16F 1/373*   (2006.01)

(52) U.S. Cl.
   CPC ............ *F16F 15/08* (2013.01); *F16F 1/3732* (2013.01)

(58) Field of Classification Search
   CPC ........ F16F 15/08; F16F 1/36; F16F 2228/007; F16F 2228/06
   USPC ...................................... 248/635; 267/141.4
   See application file for complete search history.

(56) References Cited

U.S. PATENT DOCUMENTS

| | | | | |
|---|---|---|---|---|
| 6,820,908 | B1* | 11/2004 | Tousi ..................... | B62D 21/11 248/609 |
| 9,010,716 | B2* | 4/2015 | Kobori ................. | F16F 1/3713 248/635 |
| 2006/0202400 | A1* | 9/2006 | Fitzgerald ............ | F16F 1/3732 267/293 |
| 2012/0298832 | A1* | 11/2012 | Kobori ................. | F16F 1/3713 248/635 |

(Continued)

FOREIGN PATENT DOCUMENTS

JP    6-213277 A    8/1994
JP    2014-95441 A    5/2014

OTHER PUBLICATIONS

Rie Endo et al., U.S. Appl. No. 15/072,782, filed Mar. 17, 2016.
Rie Endo et al., U.S. Appl. No. 15/072,633, filed Mar. 17, 2016.

*Primary Examiner* — Todd M Epps
(74) *Attorney, Agent, or Firm* — Fitzpatrick, Cella, Harper & Scinto

(57) ABSTRACT

A dumping structure includes a first frame on which a driving portion is mounted, a second frame, a fixture fixing the first frame to the second frame, a restrict portion, provided around the fixture and provided between the first and second frames, which restricts a distance between the first and second frames, and a damping member, provided around the restrict portion, which is compressed by the first and second frame. The damping member has rigidity lower than rigidity of the first frame, rigidity of the second frame and rigidity of the restrict portion, and has a loss factor, measured by a mechanical impedance method in the state being compressed between the first and second frames, of 0.05 or more.

17 Claims, 16 Drawing Sheets

(56) References Cited

U.S. PATENT DOCUMENTS

2012/0326369 A1* 12/2012 Kawachi .............. B60K 15/067
267/141.4
2016/0021789 A1* 1/2016 Negishi ............... H01L 23/3675
361/714

* cited by examiner

DAMPING COMPONENT AND STRUCTURE INCLUDING THE SAME

This application claims the benefit of Japanese Patent Application No. 2015-057877, filed on Mar. 20, 2015, which is hereby incorporated by reference herein in its entirety.

BACKGROUND OF THE INVENTION

Field of the Invention

The present invention relates to a damping structure capable of reducing vibration transmitted from one frame to another frame fixed with each other and to a damping component.

Description of the Related Art

Lately, frames such as a casing are formed of a thin metal plate or the like to lighten a weight of various products such as office equipment, e.g., a printer, home appliances, e.g., a refrigerator, automobiles and construction materials. If such frames are fixed with each other and if one frame is vibrated by an exciter such as a motor, there is a case when the vibration is transmitted to the other frame and the other frame generates radiation sound. Then, in order to prevent the radiation sound caused by the vibration from being generated, Japanese Unexamined Patent Application Publication Nos. 2014-95441 and 6-213277 propose to interpose vibration-proof rubber between the frames to suppress the propagation of the vibration among the frames.

A vibration-proof bush described in Japanese Unexamined Patent Application Publication No. 2014-95441 is configured such that a vibration-proof rubber member is interposed between a body panel and a sub-frame, and the body panel is connected with the sub-frame through the vibration-proof rubber member. However, because the vibration-proof rubber member is formed of soft rubber whose rigidity is low as compared to the frame, the vibration-proof rubber member is liable to deform between the body panel and the sub-frame. Therefore, relative positions of the body panel and the sub-frame are hardly determined to one position due to the deform condition of the vibration-proof rubber member and are changeable at each occasion. That is, the body panel and the sub-frame are liable to cause a positional shift. If the positional shift occurs in a case when a gear engaging with a gear provided on the sub-frame is provided on the body panel, disalignment of the gears occurs, and vibration and noise caused by the engagement condition of the gears is generated.

A vibration-proof bushing described in Japanese Unexamined Patent Application Publication No. 6-213277 is configured to attach an outer cylindrical portion formed of rubber to a bracket to suppress vibration transmitted from an attached member to the bracket. The bracket is interposed between the outer cylindrical portions and is caused to adhere only the outer cylindrical portion. In other words, the bracket and the attached member are connected by the outer cylindrical portion. Due to that, the bracket and the attached member are liable to cause a positional shift depending on a deformation condition of the outer cylindrical portion. In this case, the bracket and the attached member are liable to cause a positional shift because the outer cylindrical portion is adhered to the bracket by being compressively deformed by a screw. If the bracket and the attached member cause the positional shift, vibration and noise caused by the engagement state of the gears described above can be generated.

SUMMARY OF THE INVENTION

The present invention provides a damping component and a damping structure including the damping component reducing vibration transmitted from one frame to another frame by a simple structure. According to a first aspect of the invention, a dumping structure includes a first frame on which a driving portion is mounted, a second frame, a fixture which fixes the first frame to the second frame, a restrict portion, provided around the fixture and provided between the first and second frames, which restricts a distance between the first and second frames, and a damping member, provided around the restrict portion, which is compressed by the first and second frame. The damping member has rigidity lower than rigidity of the first frame, rigidity of the second frame and rigidity of the restrict portion, and has a loss factor, measured by a mechanical impedance method in the state being compressed between the first and second frames, of 0.05 or more.

According to a second aspect of the invention, a damping structure includes a first frame on which a driving portion is mounted, a second frame, a restrict portion restricting a distance between the first and second frames, and a damping member provided around the restrict portion and compressed by the first and second frames. The damping member has rigidity lower than rigidity of the first frame, rigidity of the second frame and rigidity of the restrict portion, and has a loss factor, measured by a mechanical impedance method in the state being compressed between the first and second frames, of 0.05 or more.

According to a third aspect of the invention, a damping component disposed between first and second frames connected by a fixture includes a base portion with a through hole through which the fixture penetrates, and a compressible damping member provided on the base portion. The damping member has rigidity lower than rigidity of the base portion and has a loss factor, measured by a mechanical impedance method in the state being compressed between the first and second frames, of 0.05 or more.

According to a fourth aspect of the invention, a damping component includes a base portion with a through hole through which a fixture penetrates, and a compressible damping member provided around the base portion. A length of the damping member in a direction in which the fixture penetrates is longer than a length of the base portion in this direction.

Further features of the present invention will become apparent from the following description of exemplary embodiments with reference to the attached drawings.

DESCRIPTION OF THE EMBODIMENTS

First Embodiment

Figure 1A:
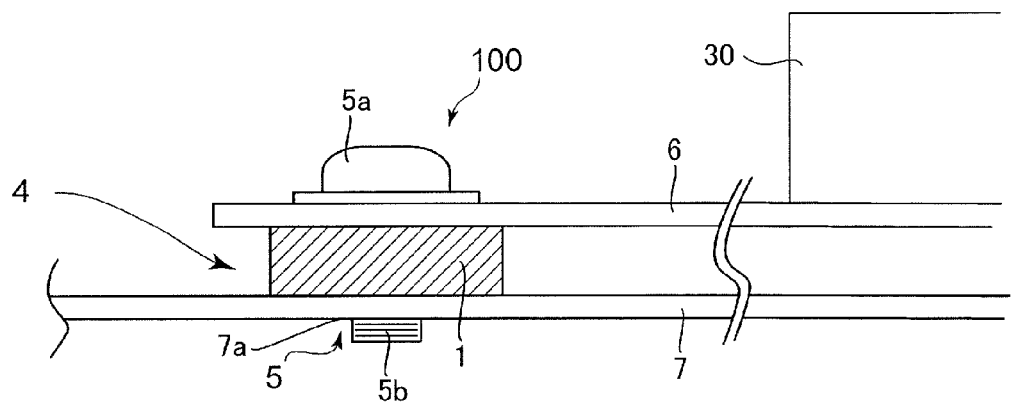
FIG. 1A is a side view illustrating a damping structure of a first embodiment.
Figure 1B:
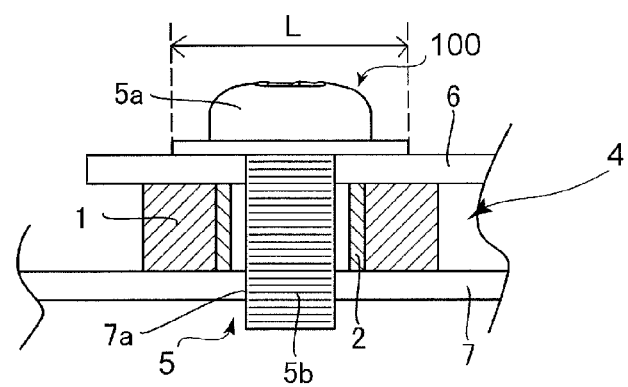
FIG. 1B is a section view of the damping structure.

Embodiments of the invention will be described below in detail with reference to the drawings. At first, a damping structure of a first embodiment will be described with reference to FIGS. 1A through 2. As shown in FIGS. 1A and 1B, the damping structure 100 includes a sub-frame 6, i.e., a first frame, and a mainframe 7, i.e., a second frame, disposed to face with each other, and a screw member 5, i.e., a fixing portion or a fixture, fixing the frames with each other. The screw member 5 includes a head portion 5a abutting with an outer surface of the sub-frame 6 and a shaft-like male thread portion 5b screwed into a screw hole 7a provided in the main frame 7. Provided between the sub-frame 6 and the main frame 7 is a damping component 4 including a damping member 1 and an inner cylinder 2. It is noted that a motor 30, i.e., an exciter, is mounted on the sub-frame 6.

Inner Cylinder

The inner cylinder 2, i.e., a restrict portion or a base portion, is provided around the screw member 5 so as to be adjacent with the screw member 5 between the sub-frame 6 and the main frame 7. The inner cylinder 2 restricts a distance between the screw member 5 and the main frame 7. Specifically, the distance between the sub-frame 6 and the main frame 7 is restricted to a length in a direction orthogonal to a radial direction of the inner cylinder 2, i.e., in an axial direction of the screw member 5 by an upper portion and lower portion of the inner cylinder 2 being abutted by the sub-frame 6 and the main frame 7, respectively. In other words, the inner cylinder 2 positions the sub-frame 6 and the main frame 7 in the axial direction of the screw member 5. However, if the inner cylinder 2 is formed of a material having rigidity lower than that of the sub-frame 6 and the main frame 7, it becomes difficult to position the sub-frame 6 and the main frame 7 in the axial direction. Therefore, preferably, the inner cylinder 2 is formed of a material whose rigidity is higher than that of the sub-frame 6 and the main frame 7, i.e., a material whose Young's modulus is high. Thus, the inner cylinder 2 may be formed of such material as SUS, iron, aluminum and resin as long as the rigidity is high. In the present embodiment, SUS304 is used for example as the material of the inner cylinder 2. It is noted that the 'rigidity' here is a concept representing deformability and is represented specifically by Young's modulus. Young's modulus can be obtained by measuring by a tensile test.

Figure 1C:
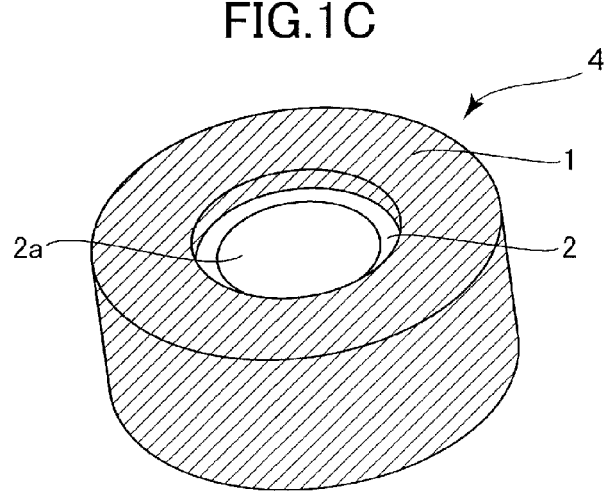
FIG. 1C is a perspective view illustrating the damping member.

The inner cylinder 2 is formed into a cylindrical shape including a through hole 2a through which the shaft portion 5b of the screw member 5 can penetrate as shown in FIG. 1C. A diameter of the through hole 2a, i.e., an inner diameter of the inner cylinder 2, is smaller than an outer diameter L of the head portion 5a of the screw member 5. However, in a case when the screw member 5 is used together with a press member such as a washer whose outer diameter is larger than the outer diameter L of the head portion 5a, the through hole 2a may be formed to have a diameter larger than the outer diameter L of the head portion 5a and smaller than the outer diameter of the washer. In short, the diameter of the through hole 2a stays within a range of an outer surface of the sub-frame 6 in contact with the washer.

Provided around an outer circumference of the inner cylinder 2 is a cylindrical damping member 1. The inner cylinder 2 is formed to have an outer diameter larger than an inner diameter of the damping member 1. Accordingly, when the inner cylinder 2 is press-fitted into an inner circumferential side of the damping member 1, the inner cylinder 2 adheres with the damping member 1 by an outer circumferential surface (side surface) thereof while compressing the damping member 1. That is, the damping member 1 is provided around the outer circumferential surface of the inner cylinder 2. In the present embodiment, while the inner cylinder 2 is formed into the cylindrical shape of 4 mm in inner diameter, 6 mm in outer diameter, and 2.5 mm in axial length, the damping member 1 is formed into the cylindrical shape of 5 mm in inner diameter, 11 mm in outer diameter, and 3 mm in axial length.

It is noted that while the inner cylinder whose thickness, i.e., a difference between the outer diameter and the inner diameter, is 1 mm is used in the present embodiment, the difference (thickness) of the inner cylinder 2 is not limited to 1 mm. It may be a minimum difference (thickness) giving such strength that the inner cylinder 2 is not deformed when the sub-frame 6 and the main frame 7 are fixed by the screw member 5. Still further, the inner cylinder 2 may be bonded and integrated with the inner cylinder 2 in advance to form one damping washer as shown in FIG. 1C.

Damping Member (Damping Material)

The damping member 1 is held while being interposed and compressed between the sub-frame 6 and the main frame 7. That is, the damping member 1 is disposed between the sub-frame 6, i.e., the first frame, and the inner cylinder 2, i.e., the restrict portion, and between the main frame 7, i.e., the second frame, and the inner cylinder 2. The inner cylinder 2 and the damping member 1 are formed such that the axial length of the inner cylinder 2, e.g., 2.5 mm, is shorter than the axial length of the damping member 1, e.g., 3 mm, so that the damping member 1 is compressively held. The damping member 1 is formed of special acrylic rubber for example and is a vibration energy absorbing member having a loss factor, measured by a mechanical impedance method in the state being compressed, of 0.05 or more. The damping member 1 has rigidity lower than rigidities of the sub-frame 6, the main frame 7 and the inner cylinder 2.

As such damping member 1, damping material such as a high damping rubber sheet such as Lostomer AGL manufactured by Kitagawa Industries Co., Ltd. may be cited. Damping is a technology of converting vibration energy around resonant point of a structure into thermal energy, and the damping member reduces vibration of a vibrated member by converting vibration energy vibrating a surface of the vibrated member into thermal energy. The damping member also has such characteristics that its loss factor becomes higher than that before compression by being compressed, and the higher the loss factor of the damping member, the more the vibration of the vibrated member can be reduced. While a damping member whose loss factor is 0.05 or more may be used to obtain the damping effect, it is desirable to use a damping member whose loss factor is 0.1 or more in order to obtain a higher damping effect. In the present embodiment, a damping member made of special acrylic rubber whose loss factor is 0.8 is used.

There is a vibration-proof member as what is similar but different from the damping member. Vibration-proof is a technology of suppressing vibration of a structure such as a building from transmitting from a junction of a foundation to another structure or foundation, and a vibration-proof member is what blocks the vibration by reducing transmission of vibration between a vibration source generating the vibration and a vibrated member. When such vibration-proof member is used, the vibration is only reflected at a spot where the vibration-proof member is provided by a vibration reducing effect of the vibration-proof member and the vibration remains on a surface of the vibrated member and is not reduced. Therefore, radiation sound caused by vibration is rarely reduced. Because it is mostly unable to obtain an effect of reducing the vibration by the vibration-proof member as described above, the vibration-proof member is not suitable to be used in the present embodiment.

The loss factor measured by a mechanical impedance method can be obtained by the following method. That is, sheet metal frames formed into a size of 150 mm×100 mm are disposed so as to face with each other and a damping member 1 of 10 mm in diameter is interposed at a center part between these two frames. Then, vibration is applied to the center part of either one frame by an exciter from a side opposite from a side on which the damping member 1 is disposed. A burst random signal (F) of a wide frequency range from 50 Hz to 5K Hz is given to the exciter to vibrate one frame in an out-of-plane direction. The other frame is provided with a plurality of acceleration pickups to obtain acceleration based on measured values at these response points. The acceleration thus obtained is converted into velocity (V) to find amplitude (|Z|) of mechanical impedance (F/V). Based on the amplitude, the loss factor (η) is found:

loss factor $(\eta)=|Z|/(2\pi f_0 m)$

Where, $f_0$ is resonance frequency and m is a mass of the damping member. The loss factor of the damping member 1 when it is compressed can be found by the method described above while compressing the damping member 1 after adjusting a distance between the two frames interposing the damping member 1.

Figure 2:
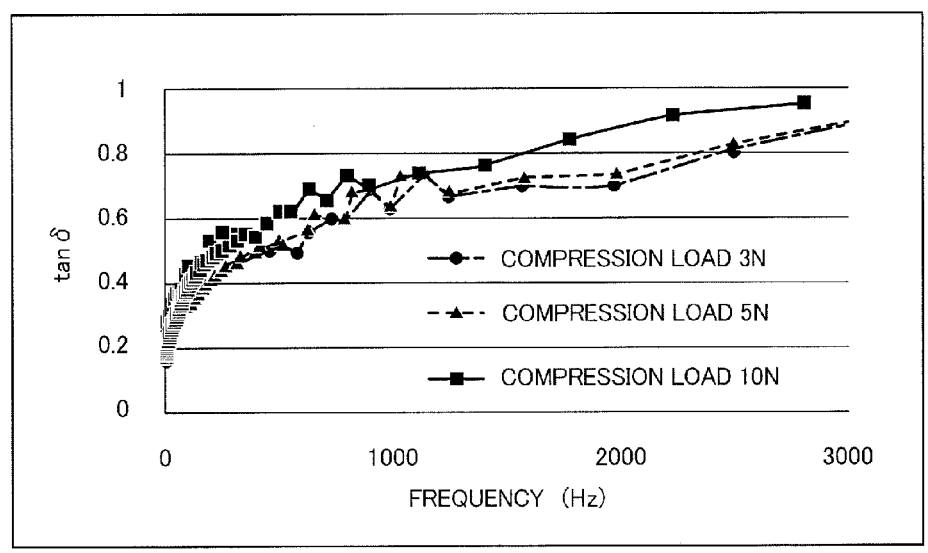
FIG. 2 is a graph indicating loss factors in a case when a compression load applied on a damping member is differentiated.

As described above, the loss factor of the damping member 1 rises more than that before compression when the damping member 1 is compressed. Regarding this point, the inventors conducted an experiment of compressing the damping member by varying the compression amount and of measuring its loss factors by using a rheometer (ARES-G2 manufactured by TA Instruments Co.). FIG. 2 is a graph indicating the loss factors (indicated by tan δ in FIG. 2) per vibration frequency measured in the case when the compression amount of the damping member was varied. In the experiment, the loss factors of the damping member 1, formed into size of 2 mm in axial length and 8 mm in outer diameter and compressed by compression loads of 3 N, 5 N, and 10 N were measured. However, the rheometer described above can measure only up to 100 Hz of vibration frequency. Therefore, a master curve was prepared in order to obtain loss factors of a high frequency side of 100 Hz or more. Then, it was possible to obtain loss factors up to about 3,000 Hz based on that.

As it is apparent from FIG. 2, the greater the compression amount of the damping member 1, the higher the loss factor (tan δ) was when the damping member 1 was compressed by the compression loads of 3 N, 5 N, and 10 N. According to this experimental result, it is considered to be better to increase the compression amount of the damping member 1 as much as possible to largely reduce the vibration of the frame. However, it is also known that the more the compression amount of the damping member 1 is increased, the more the damping member 1 is hardened. Therefore, if the damping member 1 is compressed too much, the hardness of the damping member 112 increases too much and the damping member 1 hardly distorts along with the vibration of the frame. If the damping member 1 causes no distortion, vibration energy cannot be converted into thermal energy. As a result, the vibration cannot be reduced and the radiation sound caused by the vibration cannot be reduced. In view of this point, an optimal compression amount of the damping member 1 is desirable to be larger than 0% and less than 50%, though it differs depending on the axial length and hardness before the compression. For instance, in order to compress the damping member 1 of 3 mm in axial length by a compression amount of 500 μm (by about 17%), the axial length of the inner cylinder 2 is defined to be 2.5 mm. Still further, in view of that the damping member 1 is compressively used, it is desirable to use the damping member 1 whose hardness before compression is as low as possible. For instance, it is desirable to use the damping member 1 whose hardness before compression is 70 degrees or less in terms of Asker C hardness (JIS K6253), and the damping member 1 whose hardness is 53 degrees in terms of the Asker C hardness is used in the present embodiment.

Figure 3A:
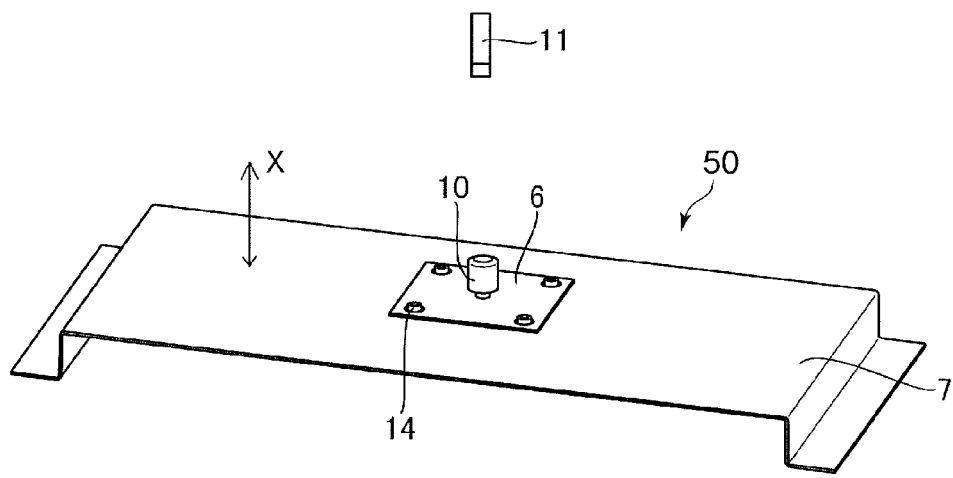
FIG. 3A is a perspective view schematically illustrating an entire configuration of an experimental simplified driving unit.

By the way, at least a part of the main frame 7 is formed to be planar. Therefore, if the damping member 1 and the inner cylinder 2 cannot be provided as shown in FIGS. 1A and 1f the sub-frame 6 vibrates along with the rotation of the motor 30, the vibration is transmitted to the main frame 7 through the screw member 5, possibly causing radiation sound from the main frame 7. Then, the inventors conducted study tests on the reducing effect of the radiation sound caused by the vibration. FIG. 3A shows an experimental simplified driving unit 50 used in the experiment. The experimental simplified driving unit 50 is what simulates a damping structure in which a motor or the like can be an exciter.

In the experimental simplified driving unit 50, the sub-frame 6 is formed of cold rolled steel of size of 50 mm×50 mm and 1 mm in thickness is fixed to the main frame 7 formed of cold rolled steel of size of 100 mm×300 mm and 1 mm in thickness at four places. An exciter 10 is provided at a center part of the sub-frame 6, and a microphone 11 is provided at a position above and distant by about 30 cm from the exciter 10. Although not shown, 21 acceleration pickups are provided equally on the main frame 7. In this experiment, a burst random signal (F) of a wide frequency range from 50 Hz to 5000 Hz was given to the exciter 10 to vibrate the sub-frame 6 in the out-of-plane direction (in the direction of an arrow X in FIG. 3A). Then, sound pressure power spectrum $Pa^2$ (dBA) and vibration power spectrum $[(m/S^2)^2]$ (dBA) of radiation sounds were measured by using Test. Lab not shown manufactured by LMS Co. It is noted that a total value of the 21 acceleration pickups was utilized in the study of the vibration level of the sub-frame 6. Still further, A weighting is applied to all results of noise level, and overall values (OA value) from 50 Hz to 4000 Hz were utilized in the study of the noise level and the vibration level of the sub-frame 6.

Figure 3B:
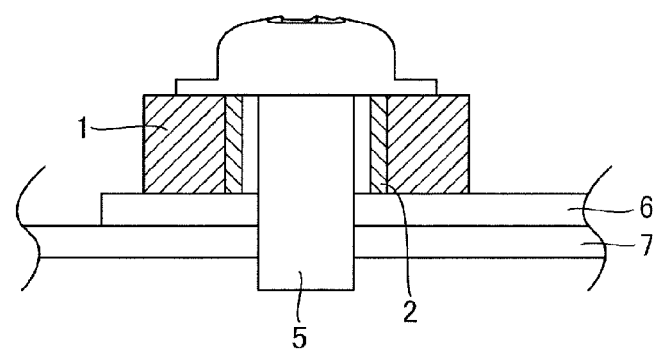
FIG. 3B is a section view illustrating a structure of a first comparative example.
Figure 3C:
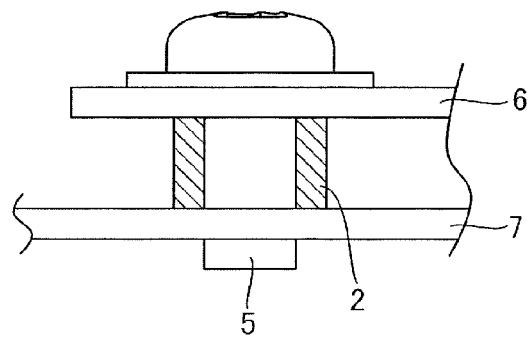
FIG. 3C is a section view illustrating a structure of a second comparative example.

For comparison, the experiment was conducted on the cases when the sub-frame 6 is fixed to the main frame 7 as shown in FIGS. 3B and 3C. FIG. 3B shows a structure of a first comparative example. The structure of the first comparative example is what the sub-frame 6 is brought into contact with the main frame 7 without leaving any space and then the damping washer in which the inner cylinder 2 is integrated with the damping member 1 as shown in FIG. 1C is attached to the sub-frame 6 by the screw member 5. In this case, the damping member 1 is held while being interposed and compressed between the head portion of the screw member 5 and the sub-frame 6. Meanwhile, FIG. 3C shows a structure of a second comparative example. As it is apparent by comparing with the damping structure 100 described above (see FIG. 1B), the structure of the second comparative example is what only the inner cylinder 2 is provided between the sub-frame 6 and the main frame 7 at the fixing portion.

Figure 4A:
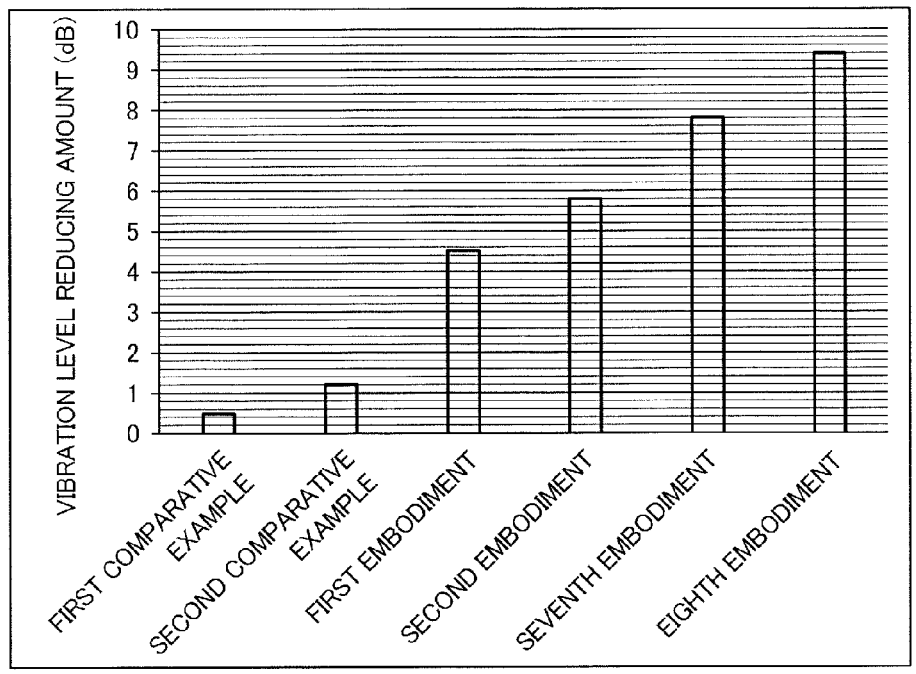
FIG. 4A is a graph indicating experimental results of the embodiments and the comparative examples concerning a vibration level reducing amount.
Figure 4B:
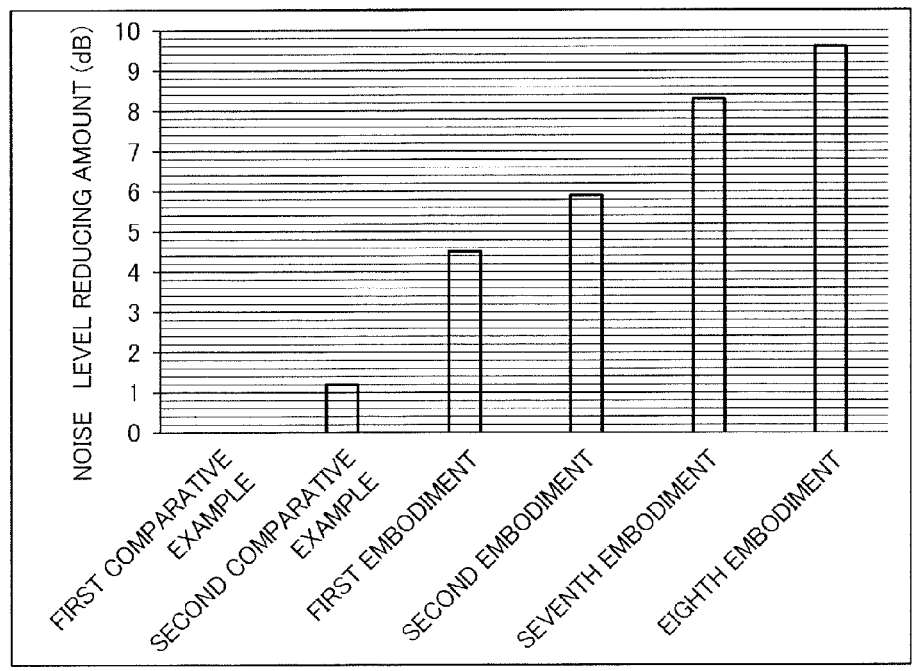
FIG. 4B is a graph indicating experimental results of the embodiments and the comparative examples concerning a noise level reducing amount.
Figure 5:
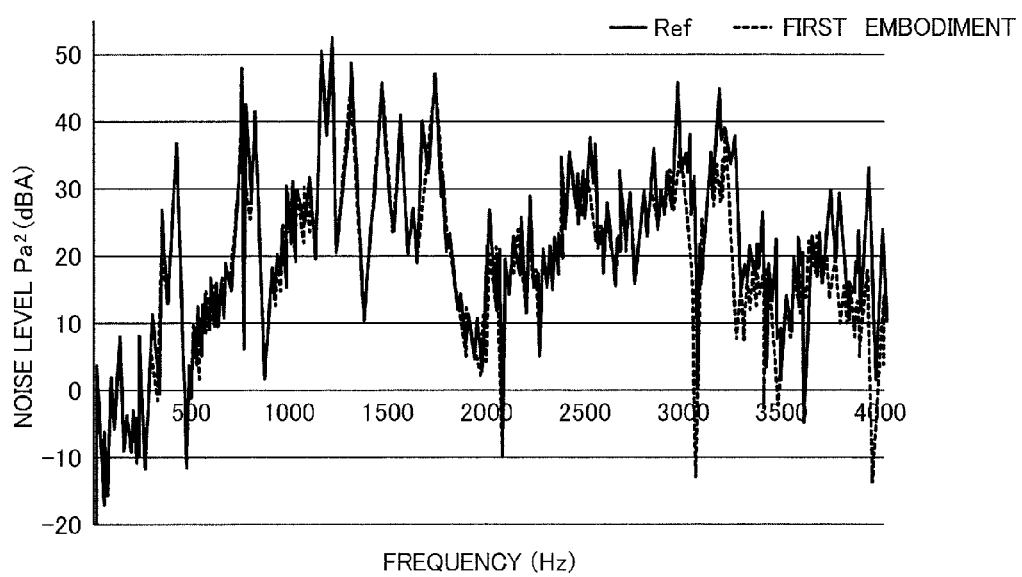
FIG. 5 is a graph indicating power spectra of noise levels of a reference configuration and of the damping structure of the first embodiment.

FIGS. 4A through 5 show the results obtained by the experiment. FIG. 4A indicates vibration level reducing amounts based on vibration level of a structure of reference configuration and FIG. 4B indicate vibration level reducing amounts based on vibration level of the structure of the reference configuration. However, FIGS. 4A and 4B indicate also experimental results of damping structures of second, seventh and eighth embodiments beside the first embodiment for convenience of drawing. FIG. 5 shows a power spectrum of the noise level of the structure of the reference configuration and a power spectrum of the noise level of the damping structure 100. It is noted that the structure of the reference configuration is what the sub-frame 6 is fixed to the main frame 7 by using alloy screws and a washer.

As shown in FIG. 4A, the damping structure 100 can reduce the vibration level by about 4 dB as compared to the first comparative example. The damping structure 100 can also reduce the vibration level by about 3.2 dB as compared to the second comparative example. Still further, as shown in FIG. 5, the damping structure 100 can reduce the noise level of not specific frequency but of a wide frequency range as compared to the reference configuration. It can be seen from these results that the damping structure 100 has a large vibration reducing effect as compared to those of the first and second comparative examples.

In the damping structure 100, the inner cylinder 2 is interposed between the sub-frame 6 and the main frame 7 and these frames were connected by the screw member 5. Thereby, because both end parts of the inner cylinder 2 come into contact respectively with the two frames and restrict the distance between the frames, an axial positional shift is hardly generated. Then, differing from the conventional technology of blocking vibration by simply interposing a vibration-proof member between frames, the highly rigid inner cylinder 2 is interposed between the frames to intentionally form a vibration propagation route that highly contributes to the propagation of the vibration and to concentrate vibration energy vibrating the frame at the fixing portion. Still further, the damping member 1 is provided around the inner cylinder 2 and the two frames are caused to compress the damping member 1 to enhance the adhesion with the frames and to cause the damping member 1 to be liable to generate distortion. Friction is generated within the damping member due to the distortion of the damping member 1, and thereby the vibration energy vibrating the frame is converted into thermal energy. Because the damping member 1 is caused to adhere with the both of the inner cylinder 2 and the frames, the damping member 1 is liable to cause the friction due to the distortion and converts the vibration energy efficiently into the thermal energy. As a result, the vibration of the frames is reduced and the radiation sound caused by the vibration is reduced.

As described above, the damping member 1 is liable to generate the distortion by the vibration of the sub-frame 6 and can reduce the vibration by efficiently converting the vibration energy into the thermal energy in the damping structure 100. Therefore, only the reduced vibration is propagated to the main frame 7, and the whole damping structure is hardly vibrated. Because it is possible to efficiently reduce the vibration in the vicinity of the exciter by disposing the damping member 1 and the inner cylinder 2 at the fixing portion of the exciter in particular, it is possible to efficiently prevent the radiation sound otherwise caused by the vibration from being generated. Still further, while many components are installed in the vicinity of the exciter in general and it is difficult to assure a space for installing the component for reducing vibration, the damping structure 100 is applicable also in such a case.

Second Embodiment

Figure 6A:
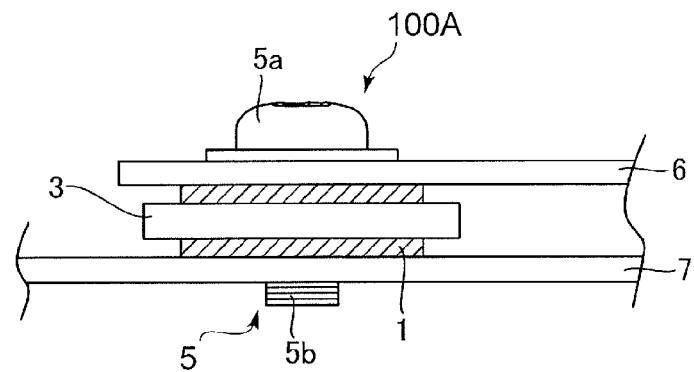
FIG. 6A is a side view illustrating a damping structure of a second embodiment.
Figure 6B:
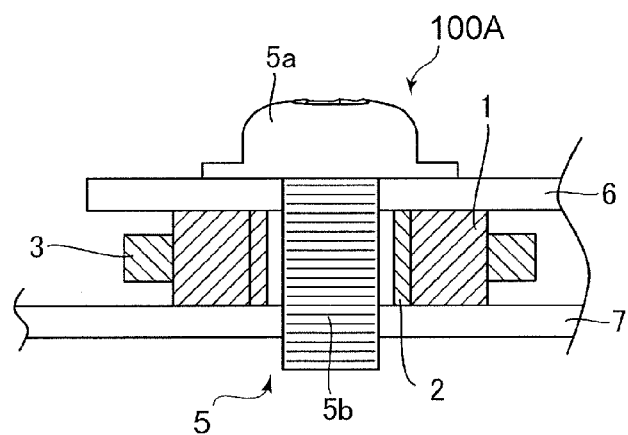
FIG. 6B is a section view of the damping structure of the second embodiment.
Figure 6C:
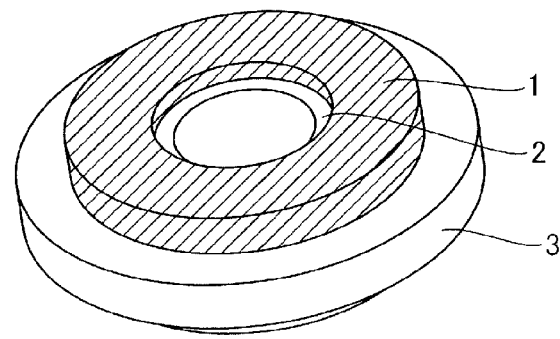
FIG. 6C is a perspective view illustrating a part of the damping structure of the second embodiment.

A damping structure 100A of a second embodiment will be described with reference to FIGS. 6A through 6C. As compared to the damping structure 100 described above (see FIGS. 1A through 1C), the damping structure 100A is different in that an outer ring member 3, i.e., an opposed member, is provided around the damping member 1 in a radial direction of the inner cylinder 2, i.e., the cylindrical member. Then, the outer ring member 3 will be mainly described in the following description and an explanation of the similar configuration with the damping structure 100 described above will be omitted here.

The cylindrical outer ring member 3 is disposed at a position facing the inner cylinder 2 through the damping member 1. The outer ring member 3 is fitted around the inner cylinder 2 through the damping member 1 and can compress the damping member 1 with the inner cylinder 2. The outer ring member 3 made of SUS304 of 10 mm in inner diameter, 14 mm in outer diameter, and 1.5 mm in axial length is used in the present embodiment. The damping member 1 is compressed by about 17%. Still further, the outer ring member 3 is disposed at a position separated from the surfaces of the sub-frame 6 and 7. That is, the outer ring member 3 is not contact with anything but the damping member 1. In other words, a length of the outer ring member 3 in an axial direction of the inner cylinder 2 is shorter than a distance between the sub and main frames 6 and 7. Therefore, even if the sub-frame 6 vibrates in the out-of-plane direction, the outer ring member 3 is not directly influenced by the vibration and does not vibrate together with the inner cylinder 2 in the same phase and amplitude.

When the sub-frame 6 vibrates, the outer ring member 3 generates an inertia force in the out-of-plane direction of the sub-frame 6. When the outer ring member 3 generates the inertia force, the outer ring member 3 moves relatively in noncontact with the sub-frame 6 in the out-of-plane direction of the sub-frame 6 while generating a phase difference. Therefore, even if the sub-frame 6 vibrates, the outer ring member 3 hardly vibrates with the same phase and amplitude with the inner cylinder 2. Then, when the vibration is propagated from the sub-frame 6 to the inner cylinder 2, the inner cylinder 2 and the outer ring member 3 move while generating the phase difference and the damping member 1 compressively held between the inner cylinder 2 and the outer ring member 3 generates distortion in a shear direction, i.e., in the out-of-plane direction of the screw member 5 or the axial direction of the screw member 5. Friction is generated within the damping member due to the distortion of the damping member 1 and vibration energy vibrating the sub-frame 6 is converted into thermal energy. Because the damping member 1 is adhered tightly to both of the inner cylinder 2 and the outer ring member 3, the damping member 1 is liable to generate the friction due to the distortion and the vibration energy is efficiently converted into the thermal energy. As a result, the vibration of the sub-frame 6 is reduced more as compared to the damping structure 100 described above and the vibration is hardly propagated to the main frame 7. Then, the radiation sound caused by the vibration of the main frame 7 is more hardly generated. It is noted that the outer ring member 3 is required to have a certain degree of weight to generate the greater inertia force and is desirable to be at least heavier than the damping member 1. Still further, the outer ring member 3 has rigidity higher than that of the damping member 1 to compress the damping member 1. It is noted that the inner cylinder 2, the damping member 1, and the outer ring member 3 may be bonded integrally in advance to form as one damping washer as shown in FIG. 6C.

Figure 7:
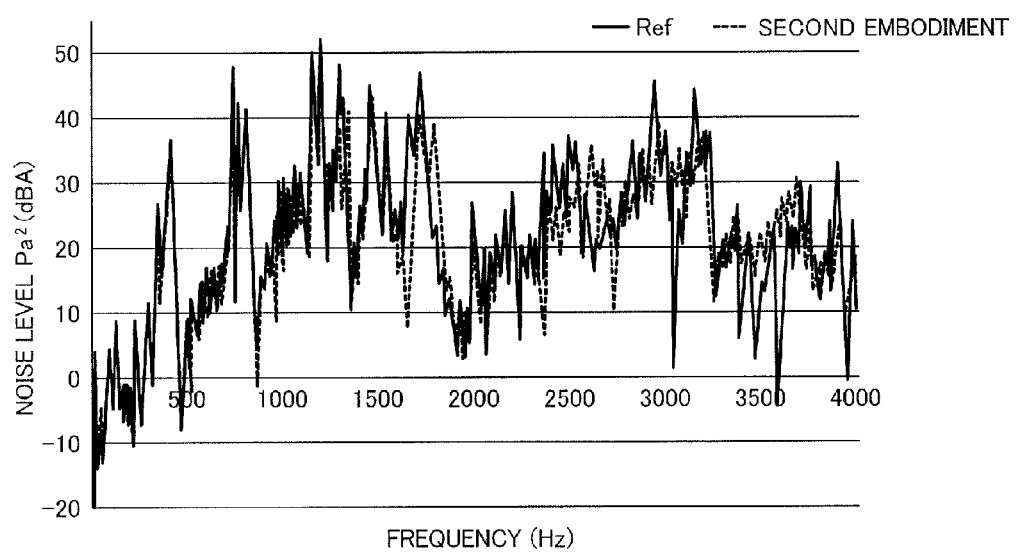
FIG. 7 is a graph indicating power spectra of the reference configuration and of the damping structure of the second embodiment.

The vibration reducing effect of the damping structure 100A will be described with reference to FIGS. 4A, 4B, and 7. FIG. 7 is a graph indicating results of the study test on the vibration reducing effect of the damping structure 100A by using the experimental simplified driving unit 50 shown in FIG. 3A. As shown in FIG. 4A, the damping structure 100A (the second embodiment) can reduce the vibration level by about 5.3 dB as compared to the first comparative example. The damping structure 100A can also reduce the vibration level by about 4.4 dB as compared to the second comparative example. The damping structure 100A can also reduce the vibration level by about 1.3 dB as compared to the damping structure 100 described above. Still further, as shown in FIG. 7, the damping structure 100A can reduce the noise level of a wide frequency range as compared to the reference configuration.

As described above, because the damping member 1 generates the greater distortion in the shear direction in the damping structure 100A, the damping structure 100A reduces the vibration as compared to the damping structure 100 described above and hence brings about the higher reducing effect of the radiation sound caused by the vibration.

Third Embodiment

Figure 8:
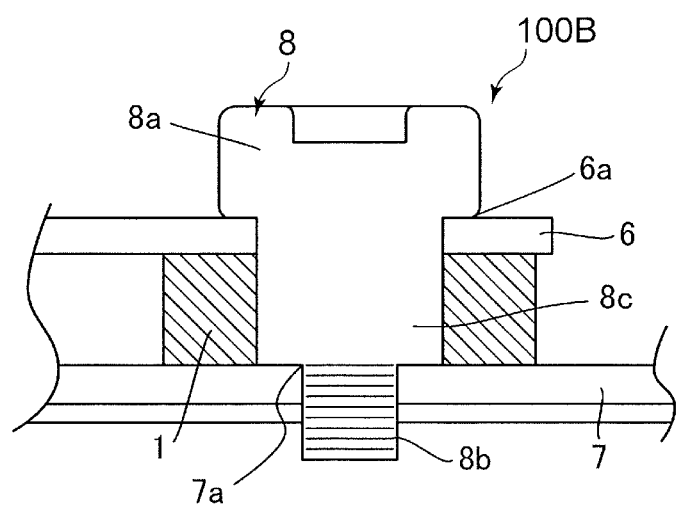
FIG. 8 is a side view illustrating a damping structure of a third embodiment.

A damping structure 100B of a third embodiment will be described with reference to FIG. 8. In the damping structure 100B shown in FIG. 8, a sub-frame 6, i.e., a first frame, is fixed with a main frame 7, i.e., a second frame, by a stepped screw 8. A damping member 1 is held between the sub-frame 6 and the main frame 7 in a state being compressed by these frames. Still further, the damping member 1 caused to adhere with the stepped screw 8, i.e., a fixing portion, while surrounding the stepped screw 8. Because the damping member 1 is the same with that of the damping structure 100 described above, an explanation thereof will be omitted here.

The stepped screw 8 is a stepped cylindrical screw member and includes a head portion 8a abutting with an outer surface of the sub-frame 6, a shaft-like male thread portion 8b screwed into a screw hole 7a provided in the main frame 7 and a stepped shaft portion 8c, i.e., a restrict portion. The stepped shaft portion 8c is formed between and integrally with the head portion 8a and the male thread portion 8b such that an outer diameter of a circumscribed surface thereof abutting with an inner circumferential surface of the sub-frame 6 is larger than an outer diameter of the male thread portion 8b. In other words, the head portion 8a, the male thread portion 8b, and the stepped shaft portion 8c are formed to have different outer diameters. It is noted that the stepped screw 8 is formed of a material having rigidity higher that rigidities of the sub-frame 6 and the main frame 7, i.e., a material having high Young's modulus.

In a case of attaching the sub-frame 6 to the main frame 7 by the stepped screw 8, the male thread portion 8b is screwed into the screw hole 7a provided in the main frame 7 while fitting the stepped shaft portion 8c into a hole-like fitted portion 6a provided in the sub-frame 6. Then, when the head portion 8a abuts against the sub-frame 6 and the stepped shaft portion 8c abuts against the main frame 7, the sub-frame 6 and the main frame 7 are fixed with each other. At this time, the stepped shaft portion 8c restricts a distance between the sub-frame 6 and the main frame 7. That is, the distance between the sub-frame 6 and the main frame 7 is restricted to a length in a direction (in the axial direction of the male thread portion 8b) orthogonal to a radial direction of the stepped shaft portion 8c.

Thus, the two frames of the sub-frame 6 and the main frame 7 are fixed by the stepped screw 8 in the damping structure 100B. Thereby, the distance between the frames is restricted and an axial positional shift hardly occurs. Still further, the frames hardly cause a positional shift in a direction intersecting with the axial direction by fixing the sub-frame 6 and the main frame 7 by the highly rigid stepped screw 8. Then, the highly rigid stepped screw 8 is used to intentionally form a vibration propagation route that highly contributes to the propagation of the vibration and to concentrate vibration energy vibrating the frame at the stepped screw 8. Still further, the damping member 1 is provided around the stepped shaft portion 8c and the two frames are caused to compress the damping member 1 to enhance the adhesion with the frames and to cause the damping member 1 to be liable to generate distortion. Friction is generated within the damping member due to the distortion of the damping member 1, and thereby the vibration energy vibrating the frame is converted into thermal energy. Because the damping member 1 caused to adhere with the both of the stepped screw 8 and the frames, the damping member 1 is liable to cause the friction due to the distortion, and the vibration energy is efficiently converted into the thermal energy. As a result, the vibration of the frames is reduced and the radiation sound caused by the vibration is reduced.

Fourth Embodiment

Figure 9:
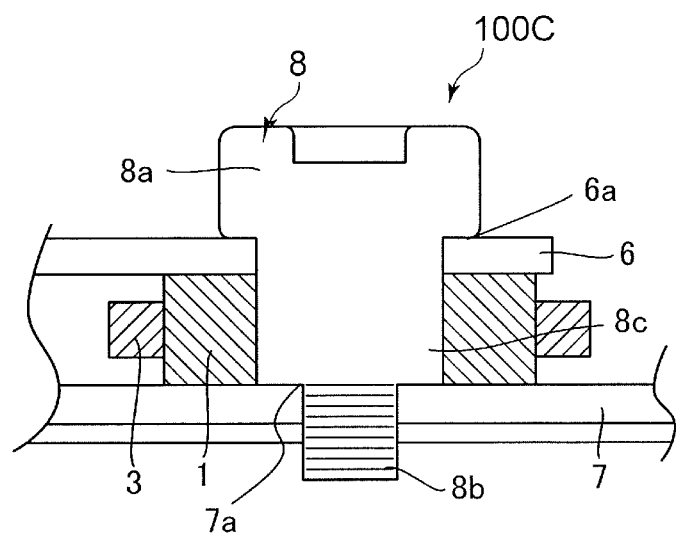
FIG. 9 is a side view illustrating a damping structure of a fourth embodiment.

A damping structure 100C of a fourth embodiment will be described with reference to FIG. 9. As compared to the damping structure 100B described above (see FIG. 8), the damping structure 100A is different in that an outer ring member 3 is provided around the damping member 1. The outer ring member 3 is the same with that of the damping structure 100A described above. That is, the cylindrical outer ring member 3 is disposed around the damping member 1 and compressively holds the damping member 1 with the stepped shaft portion 8c. In this case, the outer ring member 3 may move with respect to the stepped screw 8 while generating a phase difference when vibration is propagated to the stepped screw 8, the damping member 1 generates distortion in the shear direction. Friction is generated within the damping member due to the distortion, and vibration energy vibrating the sub-frame 6 is converted into thermal energy. The damping structure 100C can reduce the vibration more than the damping structure 100B described above because it can cause the damping member 1 to generate the distortion in the shear direction. Hence, the damping structure 100C can reduce the radiation sound otherwise caused by the vibration more.

Fifth Embodiment

Figure 10:
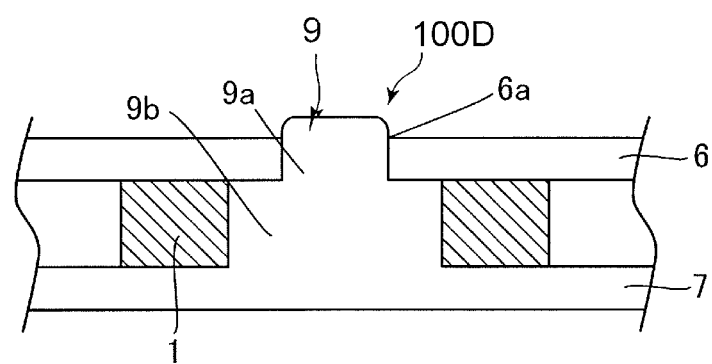
FIG. 10 is a side view illustrating a damping structure of a fifth embodiment.

A damping structure 100D of a fifth embodiment will be described with reference to FIG. 10. In the damping structure 100D shown in FIG. 10, a sub-frame 6, i.e., a first frame, is fixed with a main frame 7, i.e., a second frame, by a boss portion 9. A damping member 1 is held between the sub-frame 6 and the main frame 7 in a state being compressed by these frames. Still further, the damping member 1 is caused to surround and adhere with the boss portion 9, i.e., a fixing portion. Because the damping member 1 is the same with that of the damping structure 100 described above, an explanation thereof will be omitted here.

The boss portion 9 is formed integrally with the main frame 7 and includes a fitting portion 9a fittable with a fitted portion 6a provided in the sub-frame 6 and a butting portion 9b, i.e., a restrict portion. The boss portion 9 projects out of the main frame 7 toward the sub-frame 6. The fitting portion 9a further projects out of the butting portion 9b toward the sub-frame 6. That is, the fitting portion 9a and the butting portion 9b are formed into cylindrical shapes having different outer diameters. It is noted that the boss portion 9 is formed of a material having rigidity higher than rigidities of the sub-frame 6 and the main frame 7, i.e., a material having higher Young's modulus.

In a case of attaching the sub-frame 6 to the main frame 7 by the boss portion 9, the fitting portion 9a is fitted into the fitted portion 6a provided in the sub-frame 6. When the fitting portion 9a is fitted into the fitted portion 6a, the butting portion 9b butts against the sub-frame 6, and the sub-frame 6 and the main frame 7 are fixed with each other. At this time, the butting portion 9b restricts a distance between the sub-frame 6 and the main frame 7. That is, the distance between the sub-frame 6 and the main frame 7 is restricted to a length in a direction orthogonal to a frame surface of the butting portion 9b. It is noted that the boss portion 9 may be formed to project from the sub-frame 6 toward the main frame 7. That is, the boss portion 9 as the restrict portion may be formed such that the restrict portion projects from one frame to the other frame among the first and second frames 6 and 7 and fits into the fitted portion provided in the other frame.

As described above, the two frames of the sub-frame 6 and the main frame 7 are fixed by the boss portion 9 in the damping structure 100D. Thereby, the distance between the frames is restricted and an axial positional shift hardly occurs. Still further, the frames hardly cause a positional shift in a direction intersecting with the axial direction by fixing the sub-frame 6 and the main frame 7 by the highly rigid boss portion 9. Then, the highly rigid boss portion 9 is used to intentionally form a vibration propagation route that highly contributes to the propagation of the vibration and to concentrate vibration energy vibrating the frame at the boss portion 9. Still further, the damping member 1 is provided around the butting portion 9b and the two frames are caused to compress the damping member 1 to enhance the adhesion with the frames and to cause the damping member 1 to be liable to generate distortion. Friction is generated within the damping member due to the distortion of the damping member 1, and thereby the vibration energy vibrating the frame is converted into thermal energy. Because the damping member 1 caused to adhere with the both of the boss portion 9 and the frames, the damping member 1 is liable to cause the friction due to the distortion, and the vibration energy is efficiently converted into the thermal energy. As a result, the vibration of the frames is reduced and the radiation sound caused by the vibration is reduced.

Sixth Embodiment

Figure 11:
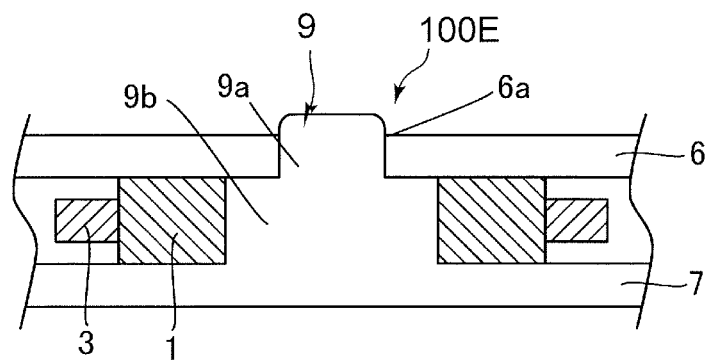
FIG. 11 is a side view illustrating a damping structure of a sixth embodiment.

A damping structure 100E of a sixth embodiment will be described with reference to FIG. 11. As compared to the damping structure 100D described above (see FIG. 10), the damping structure 100E is different in that an outer ring member 3 is provided around the damping member 1. The outer ring member 3 has been described above. In this case, because the damping structure 100E can cause the damping member 1 to generate distortion in the shear direction, it can reduce vibration more than the damping structure 100D described above and hence to reduce the radiation sound caused by the vibration more.

Seventh Embodiment

A damping structure 100F of a seventh embodiment will be described with reference to FIG. 12. In the damping structure 100F shown in FIG. 12, a sub-frame 6, i.e., a first frame, is fixed with a main frame 7, i.e., a second frame by a damping component 17. The damping component 17, i.e., a fixing portion, is configured as a vibration reducing screw and fixes the sub-frame 6 and the main frame 7 by screwing with each other. A damping member 1 and an inner cylinder 2, i.e., a restrict portion, are provided between the sub-frame 6 and the main frame 7. Because the damping member 1 and the inner cylinder 2 are the same with those of the damping structure 100 described above, an explanation thereof will be omitted here.

The damping component 17 includes an attachment member 12, i.e., a projection portion, an outer damping member 20, and an outer member 40. The attachment member 12 is a cylindrical member formed to have a length projecting from the main frame 7 toward the sub-frame 6 and projecting further from the sub-frame 6 toward a side opposite to the main frame 7 when the damping component 17 is attached to the frames. The cylindrical outer damping member 20 is disposed so as to surround an outer circumference of an end side of the attachment member 12 projecting from the sub-frame 6 to the side opposite to the main frame 7. Still further, the cylindrical outer member 40 is disposed so as to surround the outer damping member 20 at an outer circumference of the outer damping member 20. The outer member 40 is configured so as to fit around the attachment member 12 while interposing the outer damping member 20 and to be able to compress the outer damping member 20 with the attachment member 12. While the outer damping member 20 is formed into the cylindrical shape of 3 mm in inner diameter, 7 mm in outer diameter, and 8 mm in axial length for example, the outer member 40 is formed into the cylindrical shape in 6 mm in inner diameter, 9 mm in outer diameter, and 8 mm in axial length in the present embodiment. It is noted that because the outer damping member 20 may be the same with the damping member 1 already described above, an explanation thereof will be omitted here.

Figure 12:
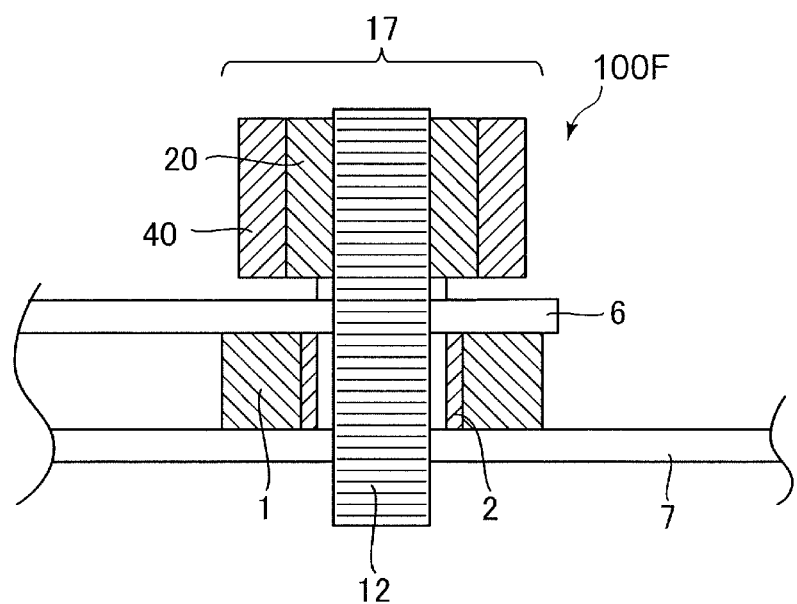
FIG. 12 is a section view illustrating a damping structure of a seventh embodiment.

As shown in FIG. 12, the outer member 40 is disposed at a position separated from the surface of the sub-frame 6 in fixing the sub-frame 6 with the main frame 7 by the damping component 17. That is, the outer member 40 does not anything but the outer damping member 20. Therefore, even if the sub-frame 6 vibrates in the out-of-plane direction, in the axial direction of the attachment member 12, the outer member 40 is not directly influenced by that and does not vibrate with the same phase and amplitude with the sub-frame 6. That is, when the sub-frame 6 vibrates, the outer member 40 generates an inertia force in the out-of-plane direction of the sub-frame 6. When the outer member 40 generates the inertia force, the outer member 40 moves relatively in the out-of-plane direction of the sub-frame 6 in noncontact with the sub-frame 6 and while generating a phase difference with respect to the attachment member 12. Therefore, even if the sub-frame 6 vibrates, the outer member 40 hardly vibrates with the same phase and amplitude with the sub-frame 6. Then, when the vibration is propagated to the attachment member 12, the attachment member 12 and the outer member 40 move while generating the phase difference and the outer damping member 20 compressively held between the attachment member 12 and the outer member 40 generates distortion in the shear direction, i.e., in the out-of-plane direction of the sub-frame 6 or the axial direction of the attachment member 12. Due to the distortion of the outer damping member 20, friction is generated within the outer damping member 20 and vibration energy vibrating the sub-frame 6 is converted into thermal energy. Because the outer damping member 20 is caused to adhere with both of the attachment member 12 and the outer member 40, the outer damping member 20 is liable to generate the friction due to the distortion and the vibration energy is efficiently converted into the thermal energy. As a result, the vibration of the sub-frame 6 is reduced and the radiation sound caused by the vibration is reduced. The outer member 40 is required to a certain degree of weight in order to generate a greater inertia force and is desirable to be heavier than the outer damping member 20.

Figure 13:
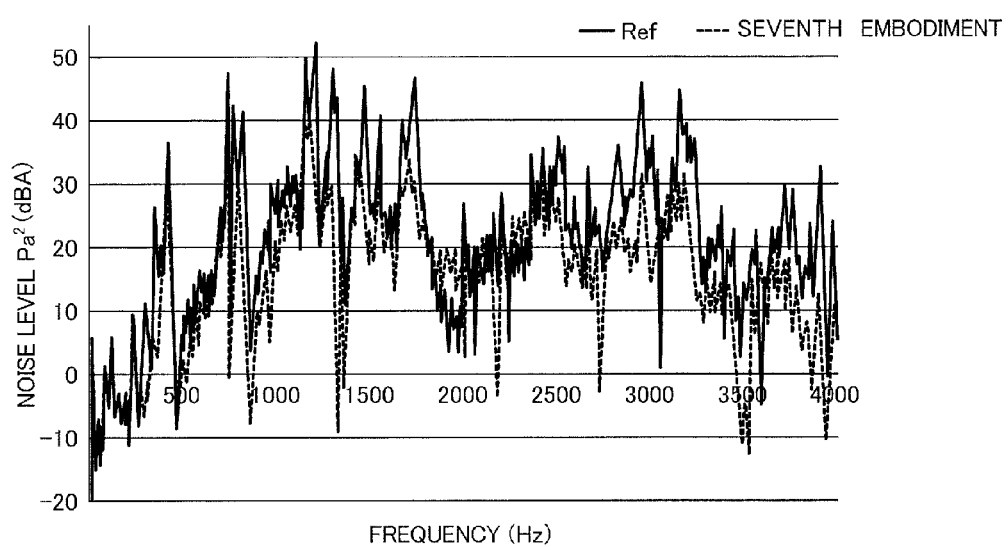
FIG. 13 is a graph indicating power spectra of the reference configuration and the damping structure of the seventh embodiment.

The vibration reducing effect of the damping structure 100F of the seventh embodiment will be described with reference FIGS. 4A, 4B and 13. FIG. 13 is a graph indicating a power spectrum of noise level of the structure of the reference configuration and a power spectrum of noise level of the damping structure 100F. As shown in FIG. 4A, the damping structure 100F (seventh embodiment) can reduce the vibration level by about 7.2 dB as compared to the first comparative example. The damping structure 100F can also reduce the vibration level by about 6.6 dB as compared to the second comparative example. Still further, the damping structure 100F can reduce the vibration level by about 2.2 dB as compared also with the damping structure 100 described above. Still further, as shown in FIG. 13, the damping structure 100 can reduce the noise level of a wide frequency range as compared to the reference configuration.

As described above, the highly rigid inner cylinder 2 is interposed between the frames to intentionally form a vibration propagation route that highly contributes to the propagation of the vibration and to concentrate vibration energy vibrating the frame at fixing portion in the damping structure 100F similarly to the damping structure 100 described above. Thereby, because the vibration energy is efficiently converted into thermal energy by the damping member 1 disposed around the inner cylinder 2, the damping structure 100F can reduce the vibration of the frames. Still further, beside this operation, the attachment member 12 and the outer member 40 move while generating a phase difference, so that the outer damping member 20 generates distortion in the shear direction. The 20 generates friction due to this distortion and the vibration energy vibrating the frame is converted into the thermal energy by this distortion. Thus, the damping structure 100 can reduce the vibration of the frames more by using the damping component 17 and hence can bring about the high reducing effect of the radiation sound caused by the vibration.

Eighth Embodiment

Figure 14:
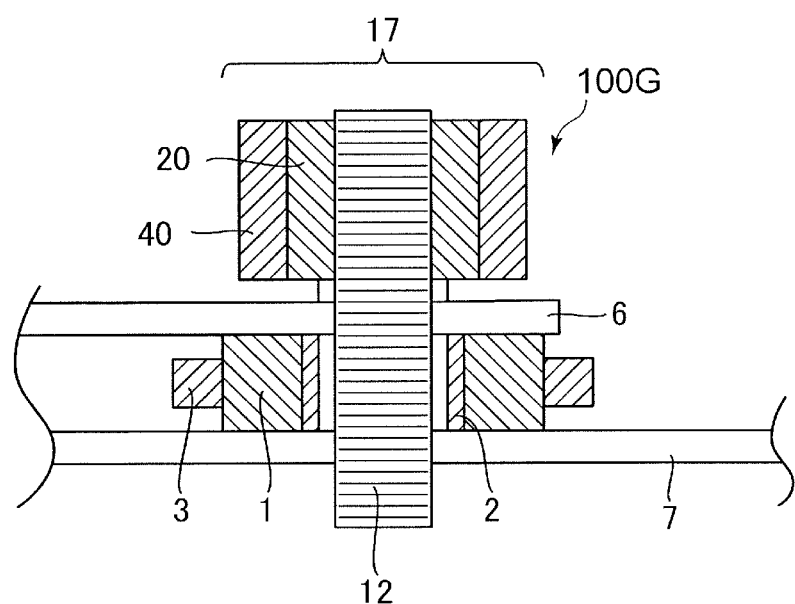
FIG. 14 is a section view illustrating a damping structure of an eighth embodiment.
Figure 15:
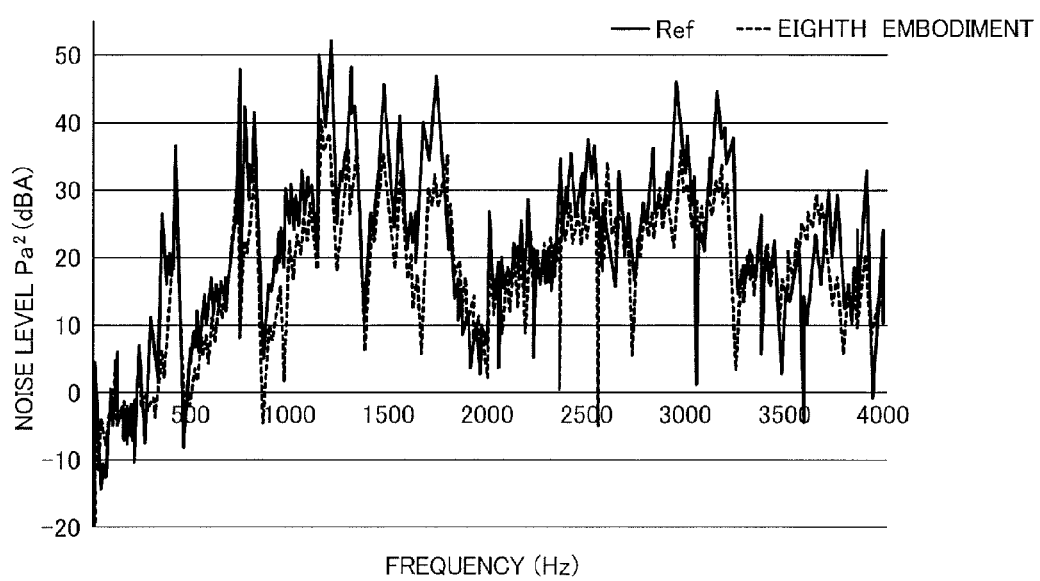
FIG. 15 is a graph indicating power spectra of the reference configuration and of the damping structure of the eighth embodiment.

A damping structure 100G of an eighth embodiment will be described with reference to FIGS. 14 and 15. As compared to the damping structure 100F described above (see FIG. 12)), the damping structure 100G shown in FIG. 14 is different in that an outer ring member 3, is provided around the damping member 1 interposed between the sub-frame 6 and the main frame 7. The outer ring member 3 is the same with what has been already described. In this case, because the damping structure 100G can cause the damping member 1 to generate distortion in the shear direction, the damping structure 100C can reduce the vibration more than the damping structure 100F described above and hence can reduce the radiation sound caused by the vibration more.

The vibration reducing effect of the damping structure 100G of the eighth embodiment will be described with reference FIGS. 4A, 4B, and 15. FIG. 15 is a graph indicating a power spectrum of noise level of the structure of the reference configuration and a power spectrum of noise level of the damping structure 100G. As shown in FIG. 4A, the damping structure 100G (eighth embodiment) can reduce the vibration level by about 8.8 dB as compared to the first comparative example. The damping structure 100G can also reduce the vibration level by about 8.2 dB as compared to the second comparative example. The 100G can also reduce the vibration level by about 1.6 dB as compared to the damping structure 100F described above. Still further, as shown in FIG. 15, the damping structure 100G can reduce the noise level of a wide frequency range as compared to the reference configuration.

Because the inner cylinder 2 and the outer ring member 3 move while generating the phase difference in the damping structure 100G, the damping member 1 generates the distortion in the shear direction. The damping member 1 generates the friction due to this distortion, and the vibration energy vibrating the frames is converted into thermal energy. Because the damping structure 100G can thus cause the damping member 1 to generate the distortion in the shear direction, the damping structure 100G can reduce the vibration more than the damping structure 100F described above and hence can reduce the radiation sound caused by the vibration more.

Ninth Embodiment

Figure 16:
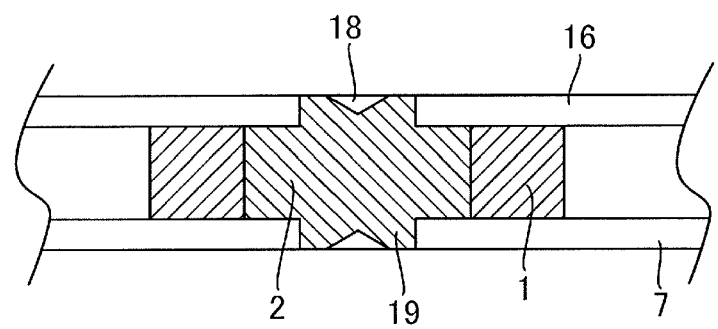
FIG. 16 is a section view illustrating a damping structure of a ninth embodiment.

As shown in FIG. 16, an inner cylinder 2 may be provided with a boss 19 and may be fixed to a sub-frame 6 and a main frame 7 through the boss 19 byway of caulking (18) and welding. In this case, it is unnecessary to provide a through hole 2a through the inner cylinder 2 (see FIG. 1).

Other Embodiments

It is noted that while the damping member 1 is provided on the outer circumferential side of the inner cylinder 2 in the damping structure 100 described above, the present invention is not limited to such configuration and the damping member 1 may be provided on the inner circumferential side of the inner cylinder 2. However, because the shaft part of the screw member 5 passes through the inner circumferential side of the inner cylinder 2, there may be not enough space for setting the damping member 1 as compared to the case where the damping member 1 is provided on the outer circumferential side of the inner cylinder 2. The inner diameter the inner cylinder 2 may be enlarged to assure the space for providing the damping member 1. In such a case, however, the head portion 5a of the screw member 5 does not overlap with the inner cylinder 2, and there is a possibility that the sub-frame 6 deflects when the screw member 5 is fastened. If the sub-frame 6 deflects, the sub-frame 6 is separated from the inner cylinder 2 and vibration of the sub-frame 6 is not efficiently propagated to the inner cylinder 2. Thus, the inner diameter of the inner cylinder 2 is preferable to be small in order to overlap the head portion 5a of the screw member 5 with the inner cylinder 2. Therefore, it is desirable to provide the damping member 1 on the outer circumferential side of the inner cylinder 2. Also, the screw member may be formed such that the head portion 5a is abutted with the outer surface of the main frame 7 and the male thread portion 5b is screwed into the sub-frame 6. That is, the head portion 5a may be abutted with the outer surface of either one of the first and second frames 6 and 7 and the male thread portion 5b may be screwed into a screw hole provided in the other one of the first and second frames 6 and 7.

It is noted that the inner cylinder 2, the stepped shaft portion 8c of the stepped screw 8, the butting portion 9b of the boss portion 9, and the attachment member 12 is not limited to be cylindrical and may be a polygonal cylinder member such as a quadrangular and hexagonal pillars. In such a case, it is preferable to match an outer shape of those members with an inner shape of the damping member provided around them to adhere the damping member with those members.

It is noted that the inner cylinder 2, the stepped shaft portion 8c of the stepped screw 8, the butting portion 9b of the boss portion 9 and the attachment member 12 may be provided so as not be adhered with the damping member 1, i.e., while keeping a gap, even though the damping effect is lowered. For instance, in the case of the damping structure 100 described above, the distance between the inner cylinder 2 and the damping member 1 is desirable to be less than the outer diameter of the inner cylinder 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A damping structure comprising:
a first frame on which a driving portion is mounted;
a second frame;
a screw which fixes the first frame to the second frame;
a restrict portion, provided around the screw and provided between the first and second frames, which restricts a distance between the first and second frames; and
a damping member provided around the restrict portion and including one surface on a side of one end of the screw in an axial direction and another surface on a side of the other end of the screw, the damping member being compressed by the first and second frames in a condition in which the one surface and the other surface of the damping member respectively contact with the first and second frames, the damping member having elasticity and rigidity, the rigidity of the damping member being lower than rigidity of the first frame, rigidity of the second frame and rigidity of the restrict portion, and the damping member having a loss factor, measured by a mechanical impedance method in a state of being compressed between the first and second frames, of 0.05 or more.

2. The damping structure according to claim 1, wherein the restrict portion has rigidity which is greater than rigidity of the first frame and rigidity of the second frame.

3. The damping structure according to claim 1, wherein the damping member is disposed between the first frame and the restrict portion.

4. The damping structure according to claim 3, wherein the damping member is disposed between the second frame and the restrict portion.

5. The damping structure according to claim 1, wherein the restrict portion is a cylindrical member and the damping member is provided around an outer circumferential surface of the cylindrical member.

6. The damping structure according to claim 5, further comprising an opposed member provided around an outer circumference of the damping member in a radial direction of the cylindrical member and compressing the damping member with the cylindrical member.

7. The damping structure according to claim 6, wherein a length of the opposed member in an axial direction of the cylindrical member is shorter than a distance between the first and second frames.

8. The damping structure according to claim 1, wherein the damping member has hardness of 70 degrees or less in terms of Asker C hardness.

9. The damping structure according to claim 1, wherein the damping member is compressed more than 0% and less than 50% from a thickness thereof before compression.

10. The damping structure according to claim 1, wherein the screw includes a head portion abutting with an outer surface of either one of the first and second frames and a male thread portion screwed into a screw hole provided in the other one of the first and second frames, and
wherein the restrict portion includes a through-hole through which the male thread portion of the screw passes.

11. The damping structure according to claim 1, wherein the driving portion is a driving motor.

12. A damping component configured to reduce a vibration from a first frame to a second frame by being disposed between the first and second frames, the damping component comprising:
a base portion configured to restrict a distance between the first and second frames, the base portion including a portion defining a through-hole through which a screw for fixing the first and second frames to each other penetrates, a first surface on a side of one end of the screw in an axial direction, and a second surface on a side of the other end of the screw in the axial direction, the first surface being configured to contact with the first frame, and the second surface being configured to contact with the second frame; and
a damping member provided to contact with an outer circumferential surface of the base portion, configured to be compressed between the first and second frames in a state in which the first and second surfaces of the base portion respectively contact with the first and second frames, the damper member including a third surface on a side of the one end of the screw and a fourth surface on a side of the other end of the screw, the third surface being configured to contact with the first frame, the fourth surface being configured to contact with the second frame, the compressible damping member having elasticity and rigidity, the rigidity of the damping member being lower than rigidity of the base portion, and the damping member having a loss factor, measured by a mechanical impedance method in a state of being compressed between the first and second frames, of 0.05 or more.

13. The damping component according to claim 12, wherein the compressible damping member has hardness of 70 degrees or less in terms of Asker C hardness.

14. The damping component according to claim 12, wherein the compressible damping member is disposed around the base portion, and wherein the damping component further comprises an opposed member disposed around the compressible damping member and compressing the damping member with the base portion.

15. A damping component configured to reduce a vibration from a first frame to a second frame by being disposed between the first and second frames, the damping component comprising:

a base portion configured to restrict a distance between the first and second frames, the base portion including a portion defining a through-hole through which a screw for fixing the first and second frames to each other penetrates, a first surface on a side of one end of the screw in an axial direction, and a second surface on a side of the other end of the screw in the axial direction, the first surface being configured to contact with the first frame, and the second surface being configured to contact with the second frame; and a damping member provided to contact with an outer circumferential surface of the base portion, configured to be compressed between the first and second frames in a state in which the first and second surfaces of the base portion respectively contact with the first and second frames, the damping member including a third surface on a side of the one end of the screw and a fourth surface on a side of the other end of the screw, the third surface being configured to contact with the first frame, the fourth surface being configured to contact with the second frame, the compressible damping member having elasticity and rigidity, and the rigidity of the compressible damping member being lower than rigidity of the base portion, wherein a distance between the third and fourth surfaces of the damping member in the axial direction is longer than a distance between the first and second surfaces of the base portion in the axial direction.

16. The damping component according to claim 15, wherein the compressible damping member has hardness of 70 degrees or less in terms of Asker C hardness.

17. The damping component according to claim 15, wherein the damping component further includes an opposed member disposed around the damping member and compressing the damping member with the base portion.

* * * * *